United States Patent [19]

Blackwell et al.

[11] 3,888,624

[45] *June 10, 1975

[54] PROCESS FOR DYEING WATER SWELLABLE CELLULOSIC MATERIALS WITH POLYPROPYLENE GLYCOLS

[75] Inventors: John Blackwell, Kennett Square, Pa.; William H. Gumprecht, Penns Grove, N.J.; Roy Emerson Starn, Jr., West Chester, Pa.

[73] Assignee: E. I. du Pont de Nemours & Company, Wilmington, Del.

[ * ] Notice: The portion of the term of this patent subsequent to Dec. 19, 1989, has been disclaimed.

[22] Filed: Aug. 29, 1972

[21] Appl. No.: 284,477

Related U.S. Application Data

[63] Continuation of Ser. No. 122,227, March 8, 1971, Pat. No. 3,706,525, which is a continuation-in-part of Ser. No. 778,809, Nov. 25, 1968, abandoned.

[52] U.S. Cl............................ 8/21 C; 8/54.2; 8/93; 8/173; 8/169
[51] Int. Cl............................................. D06p 3/82
[58] Field of Search................................... 8/173, 93

[56] References Cited
UNITED STATES PATENTS

| | | | |
|---|---|---|---|
| 2,181,800 | 11/1939 | Crossley | 8/89 UX |
| 2,965,678 | 12/1960 | Sundberg | 8/93 X |
| 3,667,898 | 6/1972 | Bergman | 8/94 |
| 3,706,525 | 12/1972 | Blackwell | 8/21 C |
| 3,758,272 | 9/1973 | Datye | 8/172 |

OTHER PUBLICATIONS

Textile Chem. & Col., Sept. 1969, page 311 copy in 4-10318TP890T43p.

*Primary Examiner*—Donald Levy

[57] ABSTRACT

A process for dyeing water swellable cellulosic materials, or mixture or blends thereof with synthetic materials, which process comprises contacting said cellulosic material in any sequence with water in sufficient amount to swell the cellulose, a preformed dye of low water solubility, and a dye solvent which is a polypropylene glycol, e.g., dipropylene glycol, is at least partly miscible with water, and boils above about 150°C. at atmospheric pressure, provided that at some stage during the process the interior of the swollen cellulose is contacted with a solution of the dye in aqueous dye solvent or dye solvent.

42 Claims, No Drawings

PROCESS FOR DYEING WATER SWELLABLE CELLULOSIC MATERIALS WITH POLYPROPYLENE GLYCOLS

CROSS-REFERENCE TO RELATED APPLICATION

This application is a continuation of application Ser. No. 122,227 filed Mar. 8, 1971 as a continuation-in-part of application Ser. No. 778,809 filed Nov. 25, 1968 and now abandoned. Application Ser. No. 122,227 issued December 19, 1972 as U.S. Pat. No. 3,706,525.

BACKGROUND OF THE INVENTION

1. Field of the Invention

This invention is directed to a process for dyeing water swellable cellulosic materials, especially cellulosic fibers, either alone or in blends or mixtures with synthetic materials, especially synthetic fibers, with preformed dyes.

2. Description of the Prior Art

The conventional procedures for dyeing water swellable cellulosic materials are represented by the following:

1. A high molecular weight water insoluble dye is formed within the material, either by reacting two smaller components, as in the formation of an azoic dye by a coupling reaction, or by a chemical reaction which renders insoluble a soluble dye precursor, as in vat and mordant dyeing.
2. A water soluble preformed dye having an affinity for the cellulosic material is exhausted onto the material from an aqueous solution by a procedure which involves reducing the solubility of the dye in the aqueous solution, as with direct dyes.
3. A dye containing a substituent which reacts with the cellulose or a modified cellulose may be exhausted onto the material from either an aqueous or non-aqueous solution under conditions such that the dye is chemically bonded to the substrate, as with fiber reactive dyes.
4. Water insoluble pigments are bonded to the cellulose with polymeric materials, as in pigment printing.
5. A finely divided form of a water insoluble dye is incorporated into the cellulose during a manufacturing step, as is sometimes done during spinning of viscose rayon.

None of these conventional procedures can be used to dye cellulose by directly introducing into the material a preformed, nonreactive, water insoluble dye since such dyes have little natural affinity for or substantivity to cellulosic materials.

Representative of the aforesaid processes wherein dyes are formed in situ after a precursor is deposited on or within the cellulose are processes disclosed in U.S. Pat. Nos. 396,692 and 2,069,215 and British Pat. No. 1,071,074. A process employing water soluble preformed dyes for dyeing cellulose is discussed in the Journal of the Society of Dyers and Colourists, 73, 23 (1957).

The use of water insoluble dyes for dyeing cellulose acetate is disclosed in U.S. Pat. No. 2,923,593. However, such substrates are considered in the art as nonswellable in the presence of water and the dyeing thereof is recognized as being unlike the dyeing of water swellable cellulosic materials.

The aforesaid processes suffer from a variety of disadvantages, such as complexity of application, inability to achieve a broad spectrum of colors, and low fastness of the dyed cellulose to aqueous washing and/or dry-cleaning with organic solvents.

The use of dyes of low water solubility for dyeing cotton is disclosed in British Pat. No. 1,112,279. The process involves the application of dye, water and urea or a structurally related compound to the substrate, followed by heating. In such a process dye utilization frequently is poor and undesirable basic degradation products from the urea or related compound may be formed.

Problems in addition to the above are encountered in the use of prior art dyeing processes for blends or mixtures of cellulosic and synthetic materials. Generally, complex two-stage processes are required and the components of the blend or mixture are dyed in separate steps with different dyes. The amounts of dyes required usually are high, with each component undesirably interfering with the dyeing of the other. The complexity of the two-stage process also is apparent from a consideration of the divergency of operating conditions between conventional dyeing processes for cellulosic and synthetic materials. In contrast to the aforesaid procedures for dyeing cellulose, the usual procedures for dyeing synthetic materials are based on dissolution of water insoluble dyes in the synthetic material.

Representative of prior art on the dyeing of blends of cellulosic and synthetic materials employing a two-stage process is U.S. Pat. No. 3,313,590. Analogous to the dyeing of such blends and confirming the aforesaid distinction between swellable cellulosic materials and nonswellable cellulose acetate, U.S. Pat. No. 3,153,563 discloses a two-stage process wherein the cellulose acetate is dyed with a water insoluble dye without coloring the cellulose which then is dyed in an independent step.

The swelling of cotton fibers and other cellulosic materials by water has long been known. Swelling usually is rapid upon contact with water, but it is facilitated by wetting agents and by heat. The swollen materials are enlarged, more flexible, reduced in strength, and otherwise modified in physical and mechanical properties. Because of their open structure, swollen cellulosic materials can be penetrated by and reacted with low molecular weight water soluble compounds. Valko and Limdi in the Textile Research Journal, 32, 331–337 (1962) report that cotton can be swollen with water containing both high boiling, water soluble, nonreactive compounds of limited molecular weight and a crosslinking agent. The water can be removed with retention of swelling and crosslinking can then be effected. The authors suggest that the technique may be useful not only for the introduction into cotton of water soluble reactive materials (crosslinking agents) but also other reactive materials which are insoluble in water but soluble in said high boiling, water soluble, nonreactive compound. A similar technique is described in U.S. Pat. No. 2,339,913 issued Jan. 25, 1944 to Hanford and Holmes. The cellulosic is swollen with water the water then is replaced with methanol-benzene and finally with benzene, with retention of swelling. A cellulose-reactive material (crosslinking agent) is added as a benzene solution and crosslinking is effected.

OBJECTS AND SUMMARY OF THE INVENTION

It is an object of the present invention to provide a process for dyeing water swellable cellulosic materials which increase in size and flexibility upon exposure to water, at high utilization of dye, continuously if desired, with a colored preformed dye which has limited water solubility and does not require oxidation, reduction, hydrolysis or other chemical modification during the process for development of color or fixation within the water swellable cellulosic material. Another object is to provide a process for dyeing water swellable cellulosic materials in admixture or blended with synthetic materials. Still another object is to provide a process for union dyeing both the cellulosic and synthetic components of a blend or mixture by means of a single dye. Another object is to provide a process for dyeing blends or mixtures of cotton and polyester or cotton and polyamide. A further object is to provide a process for dyeing cotton, regenerated cellulose and paper, particularly paper containing purified wood pulps. A still further object is to provide dyed cellulosic materials, and blends or mixtures thereof with synthetic materials, which are fast to aqueous washing and/or drycleaning with organic solvents. Other objects will become apparent hereinafter.

In summary, the objects of the present invention are achieved by means of a process which comprises contacting a water swellable cellulosic material in any sequence with:
1. water in an amount sufficient to swell the cellulosic material;
2. a colored preformed dye, more particularly described below, in an amount sufficient to color the cellulosic material; and
3. a solvent, more particularly described below, in an amount sufficient to maintain swelling of the cellulose if water is removed;

the amount of water, dye and solvent, the proportion of solvent to water, the order of contact and the contact time, and the temperature being selected so that the cellulosic material is swollen and contacted throughout with a solution of dye in solvent or aqueous solvent, and thereafter fixing the dye within and throughout the cellulosic material and recovering uniformly dyed cellulosic material which is fast to aqueous washing and drycleaning with organic drycleaning solvents.

DETAILED DESCRIPTION OF THE INVENTION

The process of this invention involves swelling the cellulosic material with water or an aqueous solvent, replacing, if necessary, a part or all of the water with a dye solvent while maintaining the cellulosic material in a swollen condition, contacting the interior of the swollen cellulose with a solution of dye in aqueous dye solvent or dye solvent, fixing the dye within and throughout the cellulosic material, and recovering uniformly dyed cellulosic material.

More particularly, the present invention resides in a process which comprises contacting a water swellable cellulosic material in any sequence with the following:
1. water in an amount sufficient to swell the cellulosic material;
2. a dye in an amount sufficient to color the cellulosic material, a boiling saturated solution of which dye in 0.1 Molar aqueous sodium carbonate exhibits an optical absorbance of 0–2; and
3. a solvent in an amount sufficient to maintain swelling of the cellulose if water is removed, and which a. is at least 2.5 weight % soluble in water at 25°C.,
b. boils above about 150°C. at atmospheric pressure,
c. is a solvent for the dye at some temperature in the range of about 0° to 225°C., and
(d) has the formula

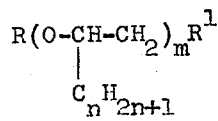

or

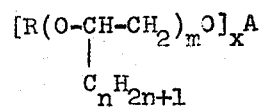

wherein $n$ is 0 or 1; $m$ is a positive whole number; $R$ is H, $C_{1-8}$ alkyl, $C_{7-15}$ aralkyl or alkaryl,

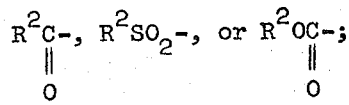

$R^1$ is —OH, —OR$^2$, —SR$^2$, —NHR$^2$, —NR$^2(C_{1-8}$ alkyl), —NR$^2(C_{7-15}$ aralkyl or alkaryl),

—OSO$_2$R$^2$,

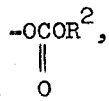

—NH(phenyl), or —NH(naphthyl); $R^2$ is $C_{1-8}$ alkyl, $C_{5-10}$ cycloalkyl, $C_{7-15}$ aralkyl or alkaryl, $C_6$ aryl, $C_{10}$ aryl, or furfuryl; $x$ is the number of unsatisfied valencies in A; and $A$ is ROCH$_2$CHORCH$_2$—, —CH$_2$CHORCH$_2$—,

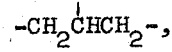

—CH$_2$C(CH$_2$OR)$_3$, (—CH$_2$)$_2$C(CH$_2$OR)$_2$, (—CH$_2$)$_3$CCH$_2$OR, (—CH$_2$)$_4$C, —CH$_2$(CHOR)$_y$CH$_2$OR, —CH$_2$(CHOR)$_y$CH$_2$—, or —CH$_2$(-CHOR)$_{y-z}$(—CH)$_z$CH$_2$— in which $y$ is 2, 3 or 4 and $z$ is 0, 1, 2, 3 or 4 but no greater than $y$; provided that at some stage during the process the interior of the swollen cellulose is contacted with a solution of the dye in aqueous solvent or solvent.

Particular embodiments of the above process include those wherein said solution is formed within and/or outside the swollen cellulose and those wherein solution of dye in aqueous dye solvent or dye solvent is achieved by means of heat, by reducing the proportion of water to dye solvent, or by adding an auxiliary solvent. Embodiments of the above process also include dyeing at elevated temperatures. In all embodiments of this invention the cellulosic material, in its swollen state, is contacted throughout, that is, not only exteriorly but throughout the entire interior regions thereof, with the solution of preformed dye in solvent or solvent-water mixture. After the dye has been distributed uniformly throughout the swollen cellulosic material, it is fixed therein by precipitation. Precipitation of the dye can be effected by obvious means, such as by cooling, by evaporating water and/or solvent, and by extracting solvent by washing and/or scouring with a liquid which preferentially removes dye solvent, that is, without removing substantial amounts of dye.

Even more particularly, the present invention resides in a process for dyeing water swellable cellulosic materials which increase in size and flexibility upon exposure to water, at high utilization of dye, batchwise or continuously, with a colored preformed dye which has limited water solubility and does not require oxidation, reduction, hydrolysis or other chemical modification during the process for fixation or development of color, which process comprises:

A. contacting the water swellable cellulosic material in any sequence, including simultaneously, at a temperature of 0°–225°C., with:
  1. water in an amount sufficient to swell the cellulosic material;
  2. a colored preformed dye in an amount sufficient to color the cellulosic material, a boiling saturated solution of which dye in 0.1 Molar aqueous sodium carbonate exhibits an optical absorbance of 0–2 as calculated from the spectrophotometrically-determined optical absorbance of the solution obtained by diluting the saturated solution ten-fold wih a 90/10 mixture, by volume, of triethylene glycol dimethyl ether and water and then cooling to room temperature; and
  3. a solvent as defined above;

B. while maintaining the cellulosic material from (A) in its swollen state, contacting same throughout with a solution of the preformed dye in solvent or solvent-water;

C. fixing said preformed dye throughout the cellulosic material by precipitating same; and D. recovering uniformly dyed cellulosic material which is fast to aqueous washing and organic solvent drycleaning.

Still other embodiments of the present invention include a rapid and simplified process of dyeing blends or mixtures of cellulosic and synthetic materials, such as polyamide or polyester, with the same dye. In such a process the cellulose is dyed as described above and the synthetic material is dyed either at the same time or in an independent step of the process.

In dyeing cellulosic materials by the process of this invention, water, dye, and dye solvent can be applied to the substrate in any sequence as long as water and dye solvent are simultaneously present at some stage which is either before or simultaneous with actual dyeing. The preferred method for dyeing fabrics composed of cellulosic fibers or mixtures of cellulosic and synthetic fibers is to impregnate the fabric with a mixture of one or more dyes, water, and dye solvent in a conventional dye padbath followed by squeezing to remove excess dye liquor, or to print with a solvent-containing printing paste, and subsequently heating to evaporate sufficient water to effect dissolution of the dye, at which time the fabric is dyed. Alternatively, water is evaporated, but in an insufficient amount to effect dissolution of the dye, after which pressure and heat are applied to effect dissolution without further evaporation of water. Dyepastes can be prepared by conventional techniques such as by milling the dye in the presence of a dispersing agent or surfactant. A dyebath can be prepared by diluting the dyepaste with water or with aqueous solvent. Addition of a solvent to the dyepaste before addition of water may cause dye separation and usually is avoided. It will be understood by those skilled in the art that additives other than a dye solvent and a dispersing agent can be present in dyebaths. Such additives frequently include migration inhibitors such as purified vegetable gums and wetting agents, examples of which are ionic and nonionic surfactants such as ethylene oxide condensation products, hydrocarbon sulfonates and longchain alcohol sulfates. Up to about 2 weight % of an inorganic salt, for example, sodium chloride, can be added to the dyebath to minimize foaming. Dyebaths used in practicing this invention also can contain dyes of a type not required for the practice of this invention; for example, a direct dyes or fiber reactive dyes for cotton or for polyamides can be present for shading purposes.

When a single padbath method of application is used to dye cotton fibers or mixtures of cotton and polyester fibers by the process of this invention, the amount of water in the dyebath mixture can range from about 10 to 95 weight %. At least about 10% water must be present in the dyebath to assure adequate swelling of cotton fibers. About 70 to 95% water is preferred. The maximum amount of water is limited only by the amount of solvent required for effective operation of the process. The amount of dye solvent in the dyebath mixture must be sufficient to maintain the cotton fibers in a swollen state if water is removed. The amount of solvent used is about 5 to 90 weight % of the dyebath mixture. Preferably, about 5 to 30% solvent is present. Preparation of stable dye dispersions may be more difficult with large amounts of solvent.

Alternatively, any two of the aforesaid three components can be applied simultaneously and the third at a different stage in the dyeing process. For instance, a conventional dispersion of dye in water can be applied in a convenient way, such as by spraying, printing, vacuum impregnation or conventional pad-roll techniques, and the solvent can be applied later in a convenient way, such as by spraying, from the surface of an embossed roll, through a porous screen or roll or by condensation onto the material from a mist or vapor. If desired, the dye can be applied first as a dry powder by electrostatic techniques or by padding or printing a conventional aqueous dye mixture followed by drying to remove water; water and dye solvent then can be applied simultaneously in any convenient way. Similarly, the dye and dye solvent can be applied, followed by application of the water. The dye and dye solvent can be applied by any convenient technique, for example, as a solution of the dye in the hot solvent or as a dispersion of the dye in the cold solvent. Optionally, the dye and/or solvent can be applied as a solution in a low-boiling auxiliary solvent such as a halogenated hydrocarbon boiling below about 130°C. Still further, alternatively, a mixture of water and solvent can be applied, the water removed by heating, and then the dye added as a powder. As the dye dissolves, by heating if necessary, dyeing is effected. Again optionally, the dye can be added as a solution or dispersion in dye solvent, as a solution in an auxiliary solvent, or as an aqueous dispersion.

Also, alternatively, the aforesaid three components can be applied separately. For example, the dye can be applied electrostatically as a dry powder or as a solution in an auxiliary solvent, followed by evaporation of the auxiliary solvent and separate application of the dye solvent and water.

If desired, any one or more of the components can be applied simultaneously with a heating step. For instance, a cold fabric containing dye and dye solvent can be introduced into an oven containing superheated steam; first, water condenses on the fabric (swelling occurs) and, later, excessive water evaporates. As the excess water is removed, the dye dissolves and dyeing occurs. Likewise, a fabric carrying dye and water can be introduced into an oven containing a mist or vapors of a dye solvent. The solvent condenses on the fabric and in so doing heats the fabric; excess water is evaporated and/or the proportion of water to solvent is decreased, by dye dissolves, and the fabric is dyed.

A similar process can be used to dye paper, or the dye can be added to the paper stock using conventional beater techniques. It also has been discovered that the process of this invention can be carried out consecutively a plurality of times, using one or more of the essential components remaining from the previous operation of the process if desired. For example, multicolor dyeings can be achieved by overprinting a previously dyed substrate.

The amount of water required for effective dyeing by the process of the present invention usually is much less than the amount applied to fabrics by padding with a dyebath as described above. In a typical padbath operation, a pickup of about 70%, based on the weight of fabric, from a padbath containing about 70% water provides fabric with over 50 weight % water, allowance being made for the equilibrium amount of water usually present in the fabric before padding. The exact amount of water required for swelling cellulosic materials depends on the experimental conditions, but usually ranges from about 10 to 20% of the dry material weight. Since cellulosic materials in equilibrium with air at normal relative humidity may contain only 5% water, additional water usually is required to achieve the necessary swelling. About 20 to 30% water, based on the dry material weight, is preferred. Large amounts of water increase the time and expense required for its evaporation and may result in unwanted dye migration, particularly when drying is effected by application of heat directly to the surface of the fabric.

The amount of dye solvent required for effective dyeing by the process of the present invention depends somewhat on the particular solvent used. More solvent usually is required if excessive amounts are lost during any heating step. The amount of dye retained within the cellulosic substrate after subsequent aqueous and solvent scouring is reduced markedly when the solvent present at the start of said heating step is less than about 3%, based on the weight of dry substrate. Usually, no more than 60% solvent is employed. Optimum fixation of dye within cotton fibers usually is obtained with about 6 to 20% solvent, based on the weight of fibers. When fabrics containing blends of cotton and hydrophobic synthetic fibers are dyed by the process of this invention, less solvent is required. For example, a 65/35 blend of polyester/cotton is efficiently dyed with as little as about 3% solvent based on the weight of dry fabric. Usually, no more than 60% solvent is employed for blends.

The temperature at which dyeing is effected by the instant process depends on the solubility of the dye in the dye solvent or aqueous dye solvent. Some dyes are sufficiently soluble, particularly when an auxiliary solvent is present, that dyeing can be effected at temperatures as low as 0°C. The solubilities of the more useful dyes are usually inadequate for obtaining desired depths of shades at temperatures below about 125°C. Temperatures above about 150°C. are preferred when dyeing cotton. Temperatures of at least about 180°C. are preferred when dyeing mixtures of cotton and polyester fibers to assure rapid and uniform dyeing of the polyester fibers. The maximum useful temperatures are limited only by the adverse effects of high temperatures on the fibers involved. Temperatures not in excess of about 225°C. usually are required to avoid effecting permanent changes in the cotton and/or the synthetic fibers.

Most of the embodiments of this invention involve heating to increase the solubility of the dye, sometimes with evaporation of water. This heating can be carried out in any convenient way, for example, by exposing the fabric to infra-red radiation or to a heated surface, by contacting the fabric with a molten metal bath or superheated steam, or by heating the fabric in a forced-draft, hot gas oven. The heating can be in separate zones or stages to control migration of undissolved dye during initial drying or to effect stepwise dyeing of blended fibers. Equipment similar to that conventionally employed in the well-known Thermosol process is preferred for dyeing continuous lengths of fabrics.

The length of any heating time employed depends on the heating means, dye, and solvent. For example, shorter heating times and lower temperatures are required when the dye dissolves in the solvent at low temperatures and when the heating means raises the temperature of the fabric rapidly, as with infra-red heating and hot can heating. Longer heating times are required with ovens containing static hot air which raises the temperature of the fabric slowly. Appreciable dye fixation can be obtained with heating times as short as one second when there is good contact between fabric and a hot metal surface. Heating times of 30 to 180 seconds are preferred for most embodiments.

It sometimes is convenient and desirable to heat the fabric in two distinct steps when dyeing blends or mixtures of fibers. For example, cotton fibers can be dyed by the process of this invention at a lower temperature than that employed in prior art processes for polyester. Hence, the cotton fibers in a cotton/polyester blend can be dyed herein at a temperature of 175°C. or below without significant dyeing of the polyester fibers. The polyester fibers then can be dyed with the same or a different dye by heating to a temperature of at least about 180°C. Advantage can be taken of this difference in dyeing temperature to reduce fire hazards associated with the more volatile and flammable dye solvents. If desired, the temperature can be held initially at 180° to 225°C. so that both the cotton and polyester can be dyed simultaneously. In another variation of the process, the synthetic fibers in a blend fabric are dyed by heating in the absence of water and/or dye solvent to a temperature of at least about 180°C. and the cotton fibers are thereafter dyed by heating at a lower temperature in the presence of the previously-absent water and/or dye solvent. Such process variations can be used to control the distribution of dye between the cotton and synthetic fibers.

The dyed fibers resulting from the process of this invention can be used without washing or scouring if desired, but inclusion of a scouring step usually is desirable to remove dye adhering to the surface of the fibers. Conventional soaping and scouring procedures, such as those commonly used in vat and azoic dyeing procedures, are adequate with those dyes which are efficiently carried into cotton fibers by this process, but an organic solvent scour sometimes is required with those dyes which are less efficiently utilized. If dyeing is effected without the use of heat and/or substantial amounts of aqueous dye solvent or dye solvent remain, scouring is necessary to achieve fastness to both aqueous washing and drycleaning. The solvents useful in organic solvent scours and preferably solvents in which the dye is highly soluble at moderate temperatures and which do not swell cellulosic fibers. Particularly preferred solvents are tetrachloroethylene and trichloroethylene. Hydrocarbon drycleaning solvents are useful with some dyes.

The cellulosic materials which can be dyed by the process of this invention include all forms of cellulose which increase in size and in flexibility upon exposure to water. Suitable materials include natural fibers and purified wood pulps as well as reconstituted cellulose in fiber and film form. Cotton fibers can be dyed in any of the forms in which they are conventionally used in textile materials and after any of the treatments conventionally used to prepare them for dyeing. Operable materials include cotton which has been treated in any way which does not significantly reduce its swelling upon heating with water; raw or scoured cotton and cotton which has been mercerized or otherwise preshrunk are operable. Reconstituted cellulosic fibers which are sufficiently open in structure so that they are swollen by water and penetrated by a dye solvent are dyeable, for example, cuprammonium rayon. Xanthate viscose rayon normally has a structure which is more difficult to swell and may require exposure to dye, water, and dye solvent for somewhat longer times at lower temperatures. Dyeing of viscose rayon fabric is promoted by the presence of wetting agents, preferably of the nonionic type, which assist penetration of the fibers by the dye solvent. Mixtures of cotton and rayon fibers can be dyed, and the instant process also is operable with purified wood pulp and paper. Excluded herein as the cellulosic material is cellulose acetate which does not exhibit the requisite swellability in the presence of water.

The synthetic materials which can be dyed by the process of this invention in mixtures or blends with cellulosic materials include polyesters, polyamides, cellulose ethers and esters, and copolymers and mixtures thereof with other components intended to make them more easily dyeable or to add other desirable properties. This invention is particularly useful for dyeing mixtures and blends of cotton and polyester or polyamide, such as mixtures containing 65 to 80% polyethylene terephthalate and 20 to 35% cotton. In dyeing the synthetic fibers of such blends, process conditions which are well recognized in the art are used.

The preformed dyes useful in practicing this invention are solid or liquid colored dyestuffs and do not require oxidation, reduction, hydrolysis, or any other chemical modification for development of either color or fastness during their application. The dyes must be sufficiently insoluble in liquids with which the dyed material will come into contact under normal use conditions so that they are not removed from the dyed article during subsequent use. For cotton textiles the dyes must be sufficiently insoluble in hot alkaline washing solutions so they are not removed during subsequent washing. A convenient test for predicting the suitability of a particular dye is to measure its solubility in boiling 0.1 Molar aqueous sodium carbonate. Preferably, it should be essentially insoluble. Visual observation of the color of the supernatant solution after boiling with a small amount of the pure dye usually is adequate to determine if the dye is too soluble, but a quantitative measurement can be obtained by measuring the optical absorbance of a saturated solution by the following procedure.

About 2.5 grams of powdered dye are agitated at reflux in 50 ml. of 0.1 Molar aqueous sodium carbonate for one hour and the mixture is filtered through a steam jacketed funnel. The filtrate is reheated to boiling and refiltered through the same funnel. Solids must be present in the funnel to assure saturation of the aqueous solution. The second filtrate is reheated to the boil, 10 ml. are withdrawn in a preheated pipette and diluted to 100 ml. with triethyleneglycol dimethyl ether, and the diluted solution is filtered to remove any flocculent colorless material (sodium carbonate). The optical absorbance of the diluted solution is determined in a unit (1 cm.) cell at the wavelength of maximum absorption of the dye in a Carey recording Spectrophotometer. Absorbance is defined as $$\log_{10}(1/T) \text{ where}$$

transmittance $T =$ (radiant power transmitted by sample/radiant power incident on sample).

In practice, the absorbance is read directly from the graduated spectrophotometer chart as the height of the absorption peak above the base line. If a longer cell is used, the value obtained from the peak height must be adjusted accordingly. From this, the absorbance of the boiling saturated aqueous solution is calculated assuming Beer's law, that is, by multiplying the measured value by 10.

An equivalent but more convenient method for carrying out the determination is described below.

About 1 gram of powdered dye is heated at reflux in 50 ml. of 0.1 Molar aqueous sodium carbonate for one hour. A 10 ml. pipette is inserted into a 6 inch long glass tube which is fitted at the top with a piece of rubber tubing that also fits tightly around the pipette and which is closed at the bottom with a 4–5.5 micron sintered glass filter. The glassware is heated by immersion in the boiling, dye-containing, sodium carbonate solution for 10 minutes. A rubber bulb is fitted to the pipette and 10 ml. of the boiling solution is sucked into it through the sintered glass filter which entraps undissolved solid dye particles. The pipette is removed from the glass tube, the stem is quickly wiped free of liquid and the contents are added to a 100 ml. volumetric flask. The volume is made up to 100 ml. by adding a mixture containing 90% triethylene glycol dimethyl ether and 10% water at room temperature (20°–25°C.).

The dye remains in solution. A small amount of sodium carbonate may precipitate but this need not be removed since it does not interfere with the determination. The optical absorbance of the diluted dye solution is determined as described above.

In order to obtain reliable results, the dye must be very pure. Colored impurities of higher solubility than the dye itself may produce erroneously high absorbance figures, whereas excessive quantities of inorganic material may inhibit dissolution of the dye and give low absorbance results. It is also important that the dye particles not be so fine that they pass through the filter and dissolve in the aqueous organic solvent system, giving an erroneously high absorbance reading. This situation usually may be corrected by controlled recrystallization of the dye from a suitable solvent before carrying out either of the above procedures.

Useful dyes for textile application exhibit an optical absorbance, measured and calculated as described above, of about 2 or less, that is from 0–2; the preferred dyes exhibit an optical absorbance of less than about 0.2. Use can be made of dyes with a lesser degree of washfastness, however, since washfastness can be improved by after-treatments, for example, by resin treatments which, in addition, may make the fabrics more attractive. If the dyed fabric is given such a resin treatment, the dyes useful in the present invention include those which exhibit optical absorbance values as high as about 30. Dyes exhibiting an optical absorbance as high as about 30 are also useful for dyeing paper since the bleedfastness standards for dyed paper usually are much less stringent than for dyed fabrics.

The optical absorbances of typical preformed dyes, determined by one of the aforesaid procedures, are shown in Table I.

TABLE I

OPTICAL ABSORBANCE VALUES FOR TYPICAL DYES

| Dye | Optical Absorbance |
|---|---|
| 1,4-bis(p-methoxyanilino)-anthraquinone | 0.1 |
| Aminoazobenzene coupled to phenyliminodiethanol dibenzoate | 0.1 |
| C.I. Disperse Orange 44 | 4.1 |
| C.I. Disperse Blue 59 | 9.8 |
| 1-amino-2-(3-hydroxybutoxy)-4-hydroxy anthraquinone | 18.4 |
| C.I. Disperse Yellow 67 | 141 |
| C.I. Disperse Orange 26 | 310 |

The dyes used in practicing this invention must be soluble in the dye solvent at some temperature in the range of about 0° to 225°C., the latter being the maximum temperature usually employed in the dyeing process so as to avoid permanently damaging the substrate. When dyeing cotton it is preferred that the dye be soluble in the dye solvent at a temperature from about 125°C. to 225°C. Visual observation of the color of a saturated solution of the pure dye in the solvent usually is adequate to determine the suitability of any particular combination of dye and solvent, but quantitative measurements can be obtained. If the optical absorbance of the dye solution is less than about 15, the dye will provide only pastel shades or light tints when used in the process of this invention. In measuring optical absorbance, the procedures previously outlined can be used except that the dye solvent is substituted for 0.1 Molar aqueous sodium carbonate and a predetermined dyeing temperature is used for saturating (as opposed to reflux temperature).

As already indicated above, for effective dyeing by the process of this invention, at some stage the dye must be in solution in the interior regions of the cellulosic material under conditions of dyeing. Although this limitation usually is met principally by a consideration of the dye and the dye solvent, it must be recognized that the dyeing process may entail other features which will affect the solubility of the dye. For example, also as noted hereinabove, solution of dye in aqueous dye solvent or dye solvent can be achieved by increasing the temperature, by removal of water so as to increase the proportion of solvent to water, or by adding an auxiliary solvent. Auxiliary solvents will be discussed more fully below. If desired, an evaluation of a dye's usefulness can be made by simulating the dyeing conditions as to temperature and ingredients present within the cellulose. If the dye dissolves to a sufficient extent, it will be operable in the process of this invention.

Dyes which are operable herein generally are of intermediate molecular weight, melting temperature and crystallinity and generally are free of water-solubilizing groups, especially if textiles are being dyed. Many of the conventional disperse dyes which are used to dye synthetic fibers from aqueous dyebaths are too soluble in hot water for satisfactory use in dyeing textiles by the process of this invention. Some of these dyes are useful in the instant process for nontextile applications or for textile applications which include an after-treatment to impart fastness to washing. Many other dyes and pigments are not sufficiently soluble in the useful dye solvents for successful use in this invention. For instance, although many vat dyes with large and complicated structures are insoluble in water in their colored or oxidized form, they also are insufficiently soluble in the useful dye solvents to be introduced into cotton fibers by this process. Most lakes and many pigments are likewise insufficiently soluble in the useful dye solvents.

Dyes having suitable solubility properties for use herein can be selected from any of the conventional dye classes such as azo, anthraquinone, indigoid, thioindigoid and phthalocyanine dyes. Suitable anthraquinone dyes include amino-substituted anthraquinones and such condensed ring derivatives of anthraquinone as the pyridinoanthraquinones and benzacridones. Azo dyes generally are more soluble in the preferred solvents and build up to heavier shades; they are a preferred class. Typical suitable azo dyes are obtained by reaction of a diazonium compound with a substituted derivative of acetoacetanilide, phenol, naphthol, aminonaphthol, aniline, 2-hydroxynaphthoic acid or phenylmethylpyrazolone. Bisazo dyes, also, can be used. The preferred dyes for dyeing blends of cotton and polyester by this invention include the aqueous alkali insoluble members of the classes of dyes which were developed particularly for dyeing polyester fibers by high temperature processes, such as the well-known Thermosol process.

The presence of the dye within a cellulosic material dyed by the process of this invention can be detected by suitable microscopic techniques.

Dye solvents found to be especially useful in this invention:

a. are at least 2.5 weight % soluble in water at 25°C.;
b. boil above about 150°C. at atmospheric pressure;

c. are solvents for the dye at some temperature in the range of about 0° to 225°C.; and
d. have the formula

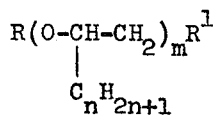

or

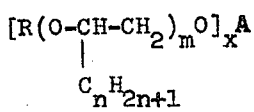

as defined hereinbelow.

One of the aforesaid classes of solvents includes glycols and derivatives of glycols having the structure:

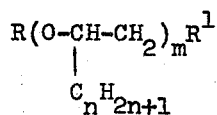

in which
$n$ is 0 or 1,
$m$ is a positive whole number,
$R$ is selected from the class consisting of H, $C_{1-8}$ alkyl, $C_{7-15}$ aralkyl or alkaryl,

$R^2SO_2-$, and

$R^1$ is selected from the class consisting of —OH, —$OR^2$, —$SR^2$, —$NHR^2$, —$NR^2(C_{1-8}$ alkyl), —$NR^2(C_{7-15}$ aralkyl or alkaryl),

—$OSO_2R^2$,

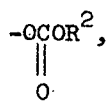

—NH(phenyl), and —NH(naphthyl), and
$R^2$ is selected from the class consisting of $C_{1-8}$ alkyl, $C_{5-10}$ cycloalkyl, $C_{7-15}$ aralkyl or alkaryl, $C_6$ aryl, $C_{10}$ aryl, and furfuryl. A particularly preferred class of solvents is the above in which $n$ is 0 and $m$ is 2 to 25.

For example, when $n$ is 0, $m$ is greater than 1, $R$ is H, and $R^1$ is —OH in the above formula, the solvents are polyethylene glycols which are available as articles of commerce in various molecular weights and molecular weight ranges. Triethylene glycol and polyethylene glycol of average molecular weight 600 are representative of such glycols.

Similarly, when $n$ is O, $m$ is greater than 1, R is $C_{1-8}$ alkyl, and $R^1$ is —OH in the above formula, the solvents are alkyl ethers of polyethylene glycols and when $R$ is H and $R^1$ is

the solvents are esters of polyethylene glycols. The preferred solvent member of these classes are the methyl ethers and acetate esters, as well as diethers, diesters, and ether esters, such as methoxy diethylene glycol acetate.

Beta-phenoxyethanol is an example of a useful solvent of the above class in which $n$ is 0, $m$ is 1, $R$ is H, and $R^1$ is —$OR^2$ wherein $R^2$ is $C_6$ aryl.

Solvents of the above formula in which $n$ is 1 and $m$ is greater than 1 are polypropylene glycols or derivatives of polypropylene glycols. BEcause of the lower water solubilities of the polypropylene glycols and their derivatives, the preferred solvents of this calss are of lower molecular weight than the corresponding polyethylene glycols and derivatives. Typically, $m$ is 4 to 12.

Suitable solvents of the above types which contain both ethylene glycol and propylene glycol moieties in their structures are also commercially available. Such solvents can be made by processes involving condensation of varying amounts of ethylene oxide with polypropylene glycols of various molecular weights, optionally with later conversion to esters or other chemical derivatives.

Other suitable solvents of the above types are reaction products of alkylene oxides with phenols, aryl amines, mercapto compounds, and sulfonic acids. Typical useful solvents of this type include products of the reaction of about ten moles of ethylene oxide per mole of phenol, aniline, thiophenol, naphthol, or sodium p-toluene sulfonate. Still other suitable solvents can be obtained by reaction of a polyglycol, such as a polyethylene glycol of about 600 average molecular weight, with one or two chemical equivalents of a compound such as ethyl chloroformate or methane sulfonyl chloride.

The other of the aforesaid classes of solvents for use herein includes a group of completely water-miscible compounds having the structure

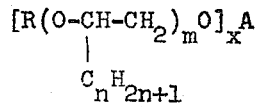

in which $x$ is the number of unsatisfied valencies in A;
A is selected from the group consisting of $ROCH_2$-$CHORCH_2$—, —$CH_2CHORCH_2$—,

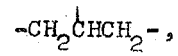

—$CH_2C(CH_2OR)_3$, (—$CH_2)_2C(CH_2OR)_2$, (—$CH_2)_3CCH_2OR$, (—$CH_2)_4C$, —$CH_2(CHOR)_yCH_2OR$, —$CH_2(CHOR)_yCH_2$—, and —$CH_2(CHOR)_{y-z}$(—CH)$_z$CH$_2$— in which $y$ is 2, 3, or 4 and $z$ is 0, 1, 2, 3 or 4 but no greater than $y$; and $n$, $m$ and $R$ are as defined above.

Many examples of compounds of this class are articles of commerce currently used primarily as polyol components in the production of urethane rubbers and foams. Representative are reaction products of alkylene oxides with glycerol, trimethylol propane, pentaerythyritol, and sorbitol, for example, those with average molecular weights of about 500. Such reaction products further modified by treatment with agents reactive toward their hydroxyl groups are also useful solvents in the subject dyeing process so long as they retain adequate water solubility. Exemplary solvents of this type can be obtained by reaction of sorbitol with ethylene oxide to obtain a product with an average molecular weight of about 600, followed by treatment with methyl chloroformate or acetic anhydride to react with up to about one half of the hydroxyl groups present.

The preferred solvents within this second class of solvent are polyols, and ether and ester derivatives thereof, wherein $n$ is zero and $m$ is no greater than 25.

In dyeing by the process of this invention, it generally is preferred that the dye solvent be completely miscible with water at 25°C. and at least under dyeing conditions. Particularly in padbath operations, the use of completely water miscible solvents simplifies preparation of the dyebath and assures penetration of the fabric and uniform dyeing. That complete miscibility is not required is borne out by the fact that β-phenoxyethanol is a satisfactory solvent when emulsified in a padbath even though it is soluble in water only to the extent of about 2.5 weight % at 25°C. It, also, is a satisfactory dye solvent when sprayed onto a fabric already containing dye and water. Dye solvents with water solubilities less than about 2.5 weight % at 25°C. generally give lower degrees of dye fixation.

The boiling point of the solvent should be sufficiently high so that water can be removed from the cellulosic material by evaporation without excessive loss of solvent. Solvents boiling above about 150°C. at atmospheric pressure have been found to be satisfactory in this respect. It must be kept in mind that solvents boiling as high as about 300°C. undergo a significant amount of evaporation in most of the embodiments of the present process. However, solvent evaporation is not essential and many non-volatile solvents are useful herein.

It has been mentioned above that auxiliary solvents can be employed in the process of the present invention. Such solvents do not meet the requisites of the dye solvents and merely represent an optional material which can be present at some stage of the process. Auxiliary solvents are halogenated hydrocarbons boiling below about 130°C. at atmospheric pressure and include trichloroethylene, tetrachloroethylene, methyl chloroform, methylene chloride and 1,1,2-trichloro-1,2,2-trifluoroethane. They have been found particularly useful in providing a means for introducing the dye in a dissolved form and, also, in the formation of the dye/water/dye solvent or dye/solvent solutions.

Representative examples which illustrate the invention and demonstrate its superiority over prior art processes are given below. Parts are by weight unless otherwise indicated. Optical absorbances (O.A.) were determined by tye method described herein. "A.I." refers to active ingredient.

EXAMPLE 1

Cotton broadcloth was padded at 100% pickup with an aqueous dispersion comprising 80 g./l. of Pigment Yellow 1, C.I. 11680, O.A. 1.1, and 10 g./l. of a long-chain alcohol condensation product with ethylene oxide. The fabric was allowed to dry and parts or it were impregnated with a mixture of water and dipropyleneglycol (b.p. 232°C.). The solvent concentration was 33% by volume. Another fabric was impregnated with a mixture containing 67% by volume of solvent.

The fabric was heated three minutes at 210°C., scoured with soap-water at the boil for 15 to 20 minutes, and washed with water. Areas which had been impregnated with the solvent-water mixtures were bright yellow, the rest of the fabric was only stained. Substantial amounts of solvent were retained by the fabric throughout the heat treatment.

EXAMPLE 2

A cotton fabric was padded to about 70% pickup with a padbath prepared by diluting 44 grams of a dye-paste containing 17.8% by weight 1-benzoylamino-4-anilinoanthraquinone, O.A. 0.2, to 500 ml. with water and mixing into the dispersion 10 grams of purified vegetable gum ("Superclear" 100N). The cloth was then dried in a low-temperature oven and stored under conditions such that it came to equilibrium absorption of moisture from the ambient atmosphere. Portions of this dry cloth were overpadded to about 70% pickup with mixtures of water and the dye solvents listed in Table II at the concentrations indicated. The wet fabrics were heated in an oven at the temperatures and for the times indicated in Table II. The fabrics were scoured in water containing an ether-alcohol sulfate detergent ("Duponol" RA) at about 90°C. for five minutes, dried, and then scoured in tetrachloroethylene at about 50°C. for five minutes and dried. A blue dyeing was obtained in all cases.

Scouring the padded and dried fabric without heating in the presence of water and a dye solvent resulted in essentially complete removal of dye, leaving the fabric no more than slightly stained.

TABLE II

| Dyeing | Dye Solvent | % Solvent in water | Heating Temperature.°C. | Heating Time, Minutes |
|---|---|---|---|---|
| 2 A | Polyethylene glycol m.w. 300 | 10 | 210 | 2 |
| 2 B | Polyethylene glycol m.w. 400 | 10 | 210 | 2 |
| 2 C | Polyethylene glycol m.w. 600 | 10 | 220 | 4 |
| 2 D | Polyethylene glycol m.w. 1000 | 10 | 220 | 4 |
| 2 E | Polyethylene glycol m.w. 1500 | 10 | 220 | 4 |

TABLE II — Continued

| Dyeing | Dye Solvent | % Solvent in water | Heating Temperature, °C. | Heating Time, Minutes |
|---|---|---|---|---|
| 2 F | Polyethylene glycol m.w. 4000 | 10 | 220 | 4 |
| 2 G | Polyethylene glycol m.w. 6000 | 10 | 220 | 4 |
| 2 H | Polypropylene glycol m.w. 425 | 10 | 220 | 4 |
| 2 I | Pentaerythritol condensed with propylene oxide, m.w. 500[a] | 10 | 220 | 2 |
| 2 J | Sorbitol condensed with propylene oxide, m.w. 530[b] | 10 | 220 | 2 |
| 2 K | Sorbitol condensed with propylene oxide, m.w. 760[c] | 10 | 220 | 2 |
| 2 L | Sorbitol condensed with propylene oxide, m.w. 555[d] | 10 | 220 | 2 |
| 2 M | Sorbitol condensed with propylene oxide, m.w. 750[e] | 10 | 220 | 2 |
| 2 N | Polypropylene oxide m.w. 1750 condensed with ethylene oxide to 40% ethylene oxide content[f] | 10 | 220 | 4 |
| 2 O | Ethylene diamine condensed with propylene oxide to m.w. 1500-2000 and then with ethylene oxide to 40–44% ethylene oxide content[g] | 10 | 220 | 4 |

Footnotes:
[a] "Pluracol" PEP 550 Tetrol
[b] Atlas G2406 Hexol
[c] Atlas G2407 Hexol
[d] Atlas G2566 Hexol
[e] Atlas G2571 Hexol
[f] "Pluronic" L64
[g] "Tetronic" 504

EXAMPLE 3

A cotton fabric was padded to about 70% pickup with a padbath containing 0.75% by weight Pigment Yellow 74, C.I. 11741, O.A. 0.1, and 2% purified vegetable gum. The padded fabric was then dried in a low-temperature oven and stored under conditions such that it came to equilibrium with the ambient atmosphere. A portion of the dried fabric was over-padded to about 70% pickup with a mixture of 80 volumes isopropanol and 20 volumes dipropylene glycol and then air-dried for about one hour, during which time essentially all the isopropanol evaporated. The dried fabric was placed for six minutes in an oven (a "Rapid Ager") heated at 130°–140°C. into which "dry" steam was passed. Water condensed on the cold fabric when it was placed in the steam-filled oven and then evporated. The heated fabric was scoured with water and tetrachloroethylene as described in Example 2. A bright yellow dyeing was obtained.

When another portion of the dried fabric was heated for four minutes in an oven at 210°C. and scoured, the fabric retained very little dye and was only slightly stained.

EXAMPLE 4

A continuous length of cotton cloth was padded to about 60% pickup with an aqueous mixture containing 175 grams per liter of a dyepaste containing 43 grams per liter of bis(1,4-para-ethoxyanilino)anthraquinone, O.A. < 2, 20 grams per liter of purified vegetable gum, and one gram per liter of monosodium phosphate. The wet padded cloth was passed through an oven maintained at 75°C. for a residence time of one minute to evaporate part of the water of the padbath. The partially dried cloth was then passed through an oven maintained at 165°C. for a residence time of 2 minutes and 48 seconds while injecting into the oven a mixture of 7 parts by weight steam superheated to about 230°C. and 3 parts by weight dipropylene glycol (b.p. 232°C.) superheated to about 250°C. Since the temperature of the oven was below the boiling temperature of dipropylene glycol but above the boiling temperature of water and the temperature of the cloth entering the oven was below 75°C., both water and dipropylene glycol condensed on the entering cloth and the water was substantially completely evaporated during passage of the cloth through the oven. After passing through the oven, a portion of the cloth was scoured with water and tetrachloroethylene as described in Example 2. A bright green dyeing was obtained. When the procedure was repeated without introducing any dye solvent into the oven along with the superheated steam, the dye was essentially completely removed from the cloth during scouring.

EXAMPLE 5

A fabric of viscose rayon was padded to about 70% pickup with an aqueous padbath containing 33 grams per liter of Pigment Yellow 74, C.I. 11741, O.A. 0.1, 3 grams per liter of a nonionic surfactant ("Alkanol"HCS), and 400 grams per liter of dipropylene glycol. The fabric was heated for 10 minutes in an oven at 150°C. and then scoured as described in EXample 9. A yellow dyeing was obtained. Scouring the padded but not heated fabric removed essentially all the dye to leave the viscose rayon only slightly stained.

EXAMPLE 6

A continuous length of cotton poplin fabric was padded to about 60% pickup with a padbath containing water, 100 grams per liter of a dyepaste containing 15% by weight of 1-benzoylamino-4-anilino anthraquinone, O.A. 0.2, 20 grams per liter of purified vegetable gum ("Superclear" 100N) and 205 grams per liter of dipropylene glycol. The padded fabric was passed at a speed of 72 inches per minute through a low-temperature oven to reduce the pickup to about 20% and then over a series of four revolving smooth-surfaced drums of such a size that the total time of contact with the drums was 71 seconds. With the drums heated at about 200°C.

and the fabric passing over them smoothly, the fabric was suddenly stopped, the portion just touching the first drum was marked, and the fabric was removed from the drums as quickly as practical. The length of fabric between the low-temperature oven and the last drum was scoured at about 80°C. with water containing 1% of an ether-alcohol sulfate surfactant ("Duponol" RA). The scouring removed essentially all the dye from the fabric which had not been in contact with the first heated drum. The dyeing developed maximum color depth in only a very short length of fabric, with the development of 50% of the maximum depth in about 1 second and the maximum color depth in 3 to 5 seconds.

EXAMPLE 7

A. A poplin fabric weighing about three ounces per square yard and containing 65% "Dacron" polyester fibers and 35% cotton fibers was padded to about 60% pickup with a water dispersion containing 0.75% by weight of the diacetate ester of 5'-[N,N'-bis(2-hydroxyethyl)amino]-2'-(2-chloro-4-nitrophenyl azo)-benzanilide, O.A. 1.7, 20 grams per liter of purified vegetable gum, and 100 grams per liter of dipropylene glycol. The padded fabric was partially dried in an air oven at 80°–100°C. and then exposed for 1.7 minutes to dry steam in an oven heated at 200°–210°C. The fabric was then rinsed for one minute each in sequence in water at 20°–30°C., in water at 90°–95°C., in water at 90°–95°C. containing 1% of an ether-alcohol sulfate detergent ("Duponol" RA), in water at 90°–95°C., and in water at 20°–30°C. After these rinses the fabric was uniformly colored in a satisfactory union dyeing of the cotton and "Dacron" fibers.

A first portion of the dyed fabric was subjected to Test III of Method 36-1965 of the American Association of Textile Chemists and Colorists to determine the washfastness of the dyeing. Severe color loss was obtained from a single washing and the washed fabric had a pronounced heather apearance because of significant loss of dye from the cotton fibers without significant loss of dye from the "Dacron" fibers.

A second portion of the dyed fabric was overpadded to about 60% pickup with an aqueous bath containing 25% by weight of commercial "permanent press" resin of the dimethyloldihydroxyimidazolone type ("Permafresh" 183) and 5% by weight of an acid catalyst (Catalyst X-4). The overpadded fabric was air dried at 80°–100°C. and then cured for 1.7 minutes in a steam-filled oven at 160°–170°C. A portion of the resintreated fabric was subjected to Test III of method 36-1965 to determine washfastness. Essentially no color loss resulted from ten Test III cycles and the fabric remained a satisfactory union dyeing.

B. The above procedure was repeated, using a dyebath free of dye solvent. After a single Test III cycle, a first portion without resin treatment and a second portion with resin treatment had essentially the same heather appearance because of severe color loss from the cotton fibers of the blend fabric.

C. Essentially the same results were obtained with resin treatments using "Aerotex" Resin 23 Special or "Aerotex" Cream 450 and appropriate catalysts instead of the resin of the dimethylolhydroxyimidazolone type.

EXAMPLE 8

One thousand parts of bleached sulfite pulp were dispersed in 18,000 parts water. Five parts of Pigment Yellow 74, C.I. 11741, O.A. 0.1, 50 parts of paper makers alum (commercial aluminum sulfate, $Al_2(SO_4)_3 \cdot 18 H_2O$) were added and the mixture was agitated for about 0.5 hour. A paper sheet was formed by conventional procedures to obtain a paper dyed a light yellow shade. A portion of this paper was dipped into a mixture of 20 parts dipropylene glycol and 80 parts water, dried for 10 minutes in an oven at 110°C., and then pressed for 30 seconds with an iron at a temperature of about 170°C. The visual strength of the dye increased 100%. Similar results were obtained with 25 and 50 parts of dye per 1000 parts of pulp. All the dyed papers were bleedfast when pressed at a pressure of 50 psi. for 15 minutes against a similar undyed paper moistened with water or 50% aqueous ethyl alcohol.

EXAMPLE 9

One thousand parts of bleached sulfite pulp were dispersed in 18,000 parts water; 6.2 parts of Disperse Red 56, O.A. 6.3, 15 parts of rosin size, and 50 parts of paper makers alum were added and the mixture was agitated for about 0.5 hour. A paper sheet was formed by conventional procedures to obtain a paper dyed a bright red shade. A portion of this paper was dipped into a mixture of 20 parts dipropylene glycol and 80 parts water, dried for 5 minutes in an oven at 100°C. and then pressed for 20 seconds with an iron at a temperature of about 170°C. The visual strength of the dye increased 50%. The bleedfastness of the dyed papers was comparable to that of papers dyed with many direct dyes and adequate for papers with many commercial end uses.

EXAMPLE 10

A cotton fabric was padded with a mixture of 0.75 gram of N,N'-(2-ethoxyphenyl)-1,4-diaminoanthraquinone, O.A. 0.8, 80 ml. of trichloroethylene, and 20 ml. of dipropylene glycol. The fabric was dried for about five minutes at room temperature to permit evaporation of trichloroethylene and was then placed for two minutes in an oven containing water vapor at 130°C. The fabric was then rinsed with warm water, scoured at 80°C. for 10 minutes in water containing an etheralcohol sulfate detergent ("Duponol" RA) and then scoured with tetrachloroethylene at 50°C. for 10 minutes. A substantial amount of dye remained fixed in the cotton fibers.

EXAMPLE 11

A continuous length of poplin fabric containing 65% polyester and 35% cotton fibers was padded to about 60% pickup with a padbath containing water, 100 grams per liter of a dye paste containing 15% by weight of 1,5-bis(p-anisidino)anthraquinone, O.A. < 2, 20 grams per liter of refined natural gums ("Superclear" 100 N), and 200 grams per liter of dipropylene glycol. The padded fabric was passed at a rate of 2 yards per minute between banks of infra-red lamps, with one 1000-watt lamp shining on each surface perpendicular to the fabric from a distance of about 3 inches. The moist fabric was then passed over a series of four revolving smooth-surfaced drums increasing stepwise in temperature from 100°C. to about 150°C. The average contact time on each drum was about 18 seconds. Next, the fabric moved continuously into an oven held at about 210°C. where the total contact time was about 90 seconds. After this last heating step, the fabric was rolled up. Samples of fabric taken both before and after the last heating step were washed as in Example 6; violet (purple) dyeings were observed. Scouring a similar portion of padded but unheated fabric resulted in removal from the fabric of essentially all of the dye. Each of the scoured samples was treated with 70% sulfuric acid at 120°F. for 15 minutes to leach out the cotton fibers leaving only polyester fibers. The table below summarizes the results of scouring and cotton leach-out.

APPEARANCE OF FABRIC AFTER TREATMENT

| Samples | Scouring 80°C. 1% Detergent | Leach-Out of Cotton Fibers in Sulfuric Acid |
|---|---|---|
| After 150°C. treatment (hot drums) | Purple dyeing | Pale purple dyeing |
| After 210°C. oven treatment | Purple dyeing | Deep purple dyeing |
| Padding unheated | Very slightly stained | Very slightly stained |

Comparison of the cotton leach-out with detergent scoured fabrics demonstrated that at 150°C. the purple dyeing was essentially due to dyeing of cotton fibers since the leach-out was a pale coloration. At the higher temperature, polyester was dyed heavily as shown by the leach-out.

Similar results were obtained with a blend of 80% polyester and 20% cotton.

EXAMPLE 12

A cotton fabric was padded with an aqueous dispersion containing 50 grams per liter of a dyepaste containing 15 percent by weight of the azo dye obtained by coupling diazotized aminoazobenzene to phenyliminodiethanol dibenzoate, O.A. 0.1, 20 grams per liter of purified vegetable gum, and 200 ml. per liter of dipropylene glycol. The fabric was divided into 12 portions. Three of these portions were further used as padded, three were dried for 20 minutes by hanging in the laboratory, three were dried for 60 minutes by hanging in the laboratory, and three were thoroughly dried in a vacuum desiccator at 0.1 mm. pressure. The moisture content of one portion of each group was determined by a Soxhlet extraction procedure. Another portion from each group was stored in a sealed container at ambient temperature for 36 hours. The remaining portion of each group was rolled up, sealed in a metal bomb, and heated at 130°C. for 7 hours. The eight portions stored at ambient temperature and heated at 130°C. were scoured as in Example 2 and the amount of dye remaining in each portion was determined by reflectance spectroscopy. The results are given in Table III in terms of percent fixation, the ratio of the amount of color in each portion to the amount in the portion having the most color. Utilization of the dye was essentially complete in the portion of the fabric having the most color.

TABLE III

| Treatment | Water Content % of a dry wt. | Percent Fixation Room Temp. 36 hrs. | Percent Fixation 130°C. 7hrs. |
|---|---|---|---|
| Padded | 108 | 0.7 | 8.1 |
| Air dried 20 min. | 23.8 | 0.8 | 9.7 |
| Air dried, 60 min. | 10.3 | 3.0 | 68 |
| Vacuum dried | 4.8 | 8.4 | 100 |

EXAMPLE 13

A piece of cotton fabric was soaked in water until thoroughly wet, blotted free of surface water by placing between paper towels, and placed in a refluxing mixture of 150 ml. of trichloroethylene, 50 ml. of dipropylene glycol, and 1.5 grams of the dye having an O.A. of 0.4 and obtained by coupling diazotized dehydrothioparatoluidine to phenyl-β-naphthylamine. The cloth was removed from the dyebath after five minutes, air dried until essentially free of trichloroethylene, and scoured with water and tetrachloroethylene as described in Example 2. The cotton fabric was dyed red. When the procedure was repeated without the aqueous soaking step, that is, using only the moisture which was present in equilibrium with that of the ambient air, the fabric was only slightly stained.

What is claimed is:

1. The process for dyeing water swellable cellulosic materials which increase in size and flexibility upon exposure to water, at high utilization of dye, with a colored, preformed, high molecular weight disperse dye which has limited water solubility and does not require oxidation, reduction, hydrolysis or other chemical modification for fixation or development of color, which process comprises:

A. contacting the water swellable cellulosic material in any sequence, including simultaneously, at a temperature of 0°–225°C., with:

1. water in an amount sufficient to swell the cellulosic material;

2. a colored, preformed, high molecular weight disperse dye in an amount sufficient to color the cellulosic material, a boiling saturated solution of which dye in 0.1 Molar aqueous sodium carbonate exhibits an optical absorbance of 0–2 as calculated from the spectrophotometrically-determined optical absorbance of the solution obtained by diluting the saturated solution tenfold with a 90/10 mixture, by volume, of triethylene glycol dimethyl ether and water and then cooling to room temperature; and 3. a solvent in an amount sufficient to maintain swelling of the cellulose if water is removed, and which a. is at least 2.5 weight % soluble in water at 25°C., b. boils above about 150°C. at atmospheric pressure, c. is a solvent for the dye at some temperature in the range of about 0° to 225°C., d. has the formula

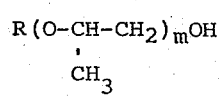

wherein $R$ is H or $C_{1-8}$ alkyl and $m$ is a positive whole number in the range 2–25 ; and e. has a molecular weight of less than 300; provided, however, that if the cellulosic material is contacted simultaneously with water and solvent, the water is 10 to 95 weight % and the solvent is 5 to 90 weight % of the combined water-solvent weights;

B. while maintaining the cellulosic material from (A) in its swollen state, contacting same throughout with a solution of the preformed dye in solvent or solvent-water;

C. fixing said preformed dye throughout the cellulosic material by precipitating same; and D. recovering uniformly dyed cellulosic material which is fast to aqueous washing and organic solvent drycleaning.

2. The process of claim 1 wherein the cellulosic material is cotton, regenerated cellulose or wood pulp and wherein the solution of the preformed dye in solvent or solvent-water is obtained by employing an elevated temperature.

3. The process of claim 1 wherein the solution of the preformed dye in solvent or solvent-water is obtained by reducing the proportion of water to dye solvent.

4. The process of claim 1 wherein the solution of the preformed dye in solvent or solvent-water is obtained by adding an auxiliary solvent which is a halogenated hydrocarbon having an atmospheric pressure boiling point of less than about 130°C.

5. The proces of claim 1 wherein said dye exhibits an optical absorbance of less than about 0.2.

6. The process of claim 2 wherein there is applied to the cellulosic material sufficient water and dye solvent to provide at least about 10 weight % water and about 3 to 60 weight % dye solvent, based on the dry weight of cellulosic material.

7. The process of claim 2 wherein the dye is an amino-substituted anthraquinone or a monoazo or bisazo dye.

8. The process of claim 2 wherein the dye solvent is a polyol or an ether derivative thereof, which solvent is completely miscible with water at dyeing conditions.

9. The process of claim 8 wherein the water, dye solvent and dye are contacted with the cellulosic material simultaneously.

10. The process of claim 9 wherein the dye is applied by printing.

11. The process of claim 9 wherein cotton fibers are:
A. impregnated in a dye bath mixture comprising
 1. about 10 to 95 weight % water and
 2. about 5 to 90 weight % of a solvent which is miscible with water at the dyeing conditions,
said dye being essentially insoluble in boiling 0.1 Molar aqueous sodium carbonate and soluble in the dye solvent at a temperature from about 125° to 225°C.; and
B. heated to 125° to 225°C.

12. The process of claim 11 wherein the cotton fibers, after dyeing, are scoured with an aqueous detergent solution.

13. The process of claim 9 wherein cotton fibers are:
A. impregnated in a dye bath mixture comprising
 1. about 10 to 95 weight % water and
 2. about 5 to 90 weight % of a solvent which is miscible with water at the dyeing conditions,
said dye being soluble in the dye solvent at a temperature from about 125° to 225°C., said dye exhibiting an optical absorbance of less than about 0.2; and
B. heated to 125° to 225°C.

14. The process of claim 13 wherein the cotton fibers, after dyeing, are scoured with an aqueous detergent solution.

15. The process of claim 1 wherein the water, dye solvent and dye are contacted with the cellulosic material in at least two steps.

16. The process of claim 15 wherein water, dye solvent and dye are contacted with the cellulosic material in three steps.

17. The process of claim 15 wherein dye and water are contacted with the cellulosic material in one step and dye solvent is contacted with the cellulosic material in another step.

18. The process of claim 15 wherein dye and dye solvent are contacted with the cellulosic material in one step and water is contacted with the cellulosic material in another step.

19. The process of claim 15 wherein water and dye solvent are contacted with the cellulosic material in one step, dye is contacted with the cellulosic material in another step, and the swollen cellulosic material is contacted with said dye solution at 125° to 225°C.

20. The process of claim 18 wherein dye and dye solvent are as a solution in an auxiliary solvent which is a halogenated hydrocarbon having an atmospheric pressure boiling point of less than about 130°C.

21. The process of claim 19 wherein the dye is applied by printing.

22. The process of claim 21 wherein the cellulosic material, after dyeing, is scoured with an aqueous detergent solution.

23. The process of claim 1 wherein the water swellable cellulosic material is admixed or blended with a synthetic material.

24. The process of claim 23 wherein the cellulosic material is cotton and the synthetic material is polyester or polyamide.

25. The process of claim 23 wherein there is applied to the blend or mixture sufficient water and dye solvent to provide at least about 10 weight % water, based on the dry cellulosic component, and about 3 to 60 weight % dye solvent, based on the dry blend.

26. The process of claim 23 wherein the dye is an amino-substituted anthraquinone or a monoazo or bisazo dye.

27. The process of claim 23 wherein the solution of the preformed dye in solvent or solvent-water is obtained by employing an elevated temperature.

28. The process of claim 23 wherein the solution of the preformed dye in solvent or solvent-water is obtained by reducing the proportion of water to dye solvent.

29. The process of claim 23 wherein the solution of the preformed dye in solvent or solvent-water is obtained by adding an auxiliary solvent which is a halogenated hydrocarbon having an atmospheric pressure boiling point of less than about 130°C.

30. The process of claim 24 wherein the cotton comprises 20 to 35 weight %, and the synthetic material is polyester and comprises 65 to 80 weight %, of the blend or mixture.

31. The process of claim 24 wherein the blend or mixture is contacted with dye, water and dye solvent and then heated, first at a temperature sufficient to effect dyeing of the cotton but not the synthetic material, and thereafter at a temperature sufficient to effect dyeing of the synthetic material but not in excess of about 225°C.

32. The process of claim 24 wherein the blend or mixture is contacted with dye and heated at a temperature sufficient to effect dyeing of the synthetic material, and then, contacted with dye, dye solvent and water at a temperature sufficient to effect dyeing of the cotton, both the aforesaid temperatures being not in excess of about 225°C.

33. The process of claim 24 wherein the same dye is used to dye the cotton and the synthetic material.

34. The process of claim 23 wherein the dye solvent is a polyol or an ether derivative thereof, which solvent is completely miscible with water at dyeing conditions.

35. The process of claim 34 wherein the water, dye solvent and dye are contacted with the blend or mixture simultaneously.

36. The process of claim 34 wherein the water, dye solvent and dye are contacted with the blend or mixture in at least two steps and the swollen cellulosic material is contacted with said dye solution at 125° to 225°C.

37. The process of claim 36 wherein the dye is applied by printing.

38. The process of claim 37 wherein the blend or mixture, after dyeing, is scoured with an aqueous detergent solution.

39. The process of claim 35 wherein the blend or mixture is:
A. impregnated in a dye bath mixture comprising
   1. about 10 to 95 weight % water and
   2. about 5 to 90 weight % of a solvent which is miscible with water at the dyeing conditions,
said dye being essentially insoluble in boiling 0.1 Molar aqueous sodium carbonate and soluble in the dye solvent at a temperature from about 125° to 225°C.; and
B. heated to 125° to 225°C.

40. The process of claim 39 wherein the blend or mixture, after dyeing, is scoured with an aqueous detergent solution.

41. The process of claim 35 wherein the blend or mixture is:
A. impregnated in a dye bath mixture comprising
   1. about 10 to 95 weight % water and
   2 about 5 to 90 weight % of a solvent which is miscible with water at the dyeing conditions,
said dye being soluble in the dye solvent at a temperature from about 125° to 225°C., said dye exhibiting an optical absorbance of less than about 0.2; and
B. heated to 125° to 225°C.

42. The process of claim 41 wherein the blend or mixture, after dyeing, is scoured with an aqueous detergent solution.

* * * * *